Nov. 8, 1960 F. C. BOGGESS 2,959,236
TRAILER DRIVE
Filed March 14, 1958 4 Sheets-Sheet 3
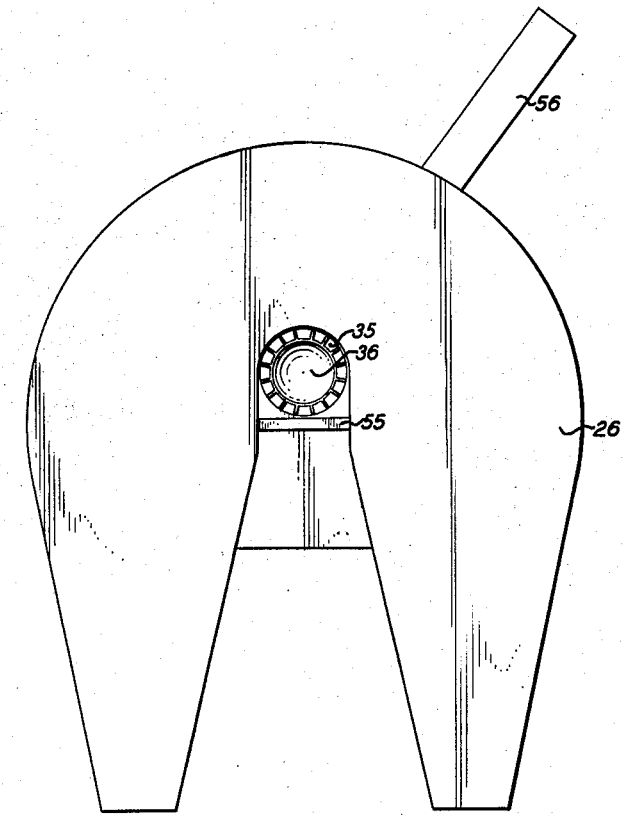
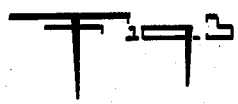
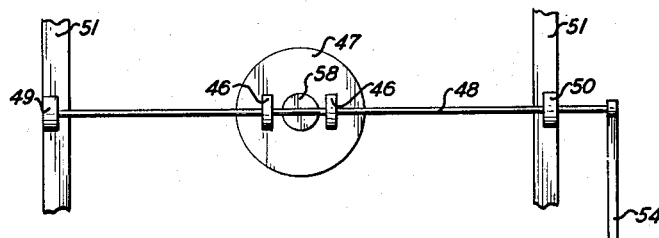
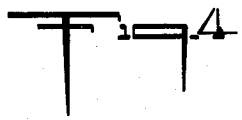
INVENTOR
FRANCIS C. BOGGESS
BY *Fisher, Christen & Goodson*
ATTORNEYS Nov. 8, 1960  F. C. BOGGESS  2,959,236
TRAILER DRIVE
Filed March 14, 1958  4 Sheets-Sheet 4

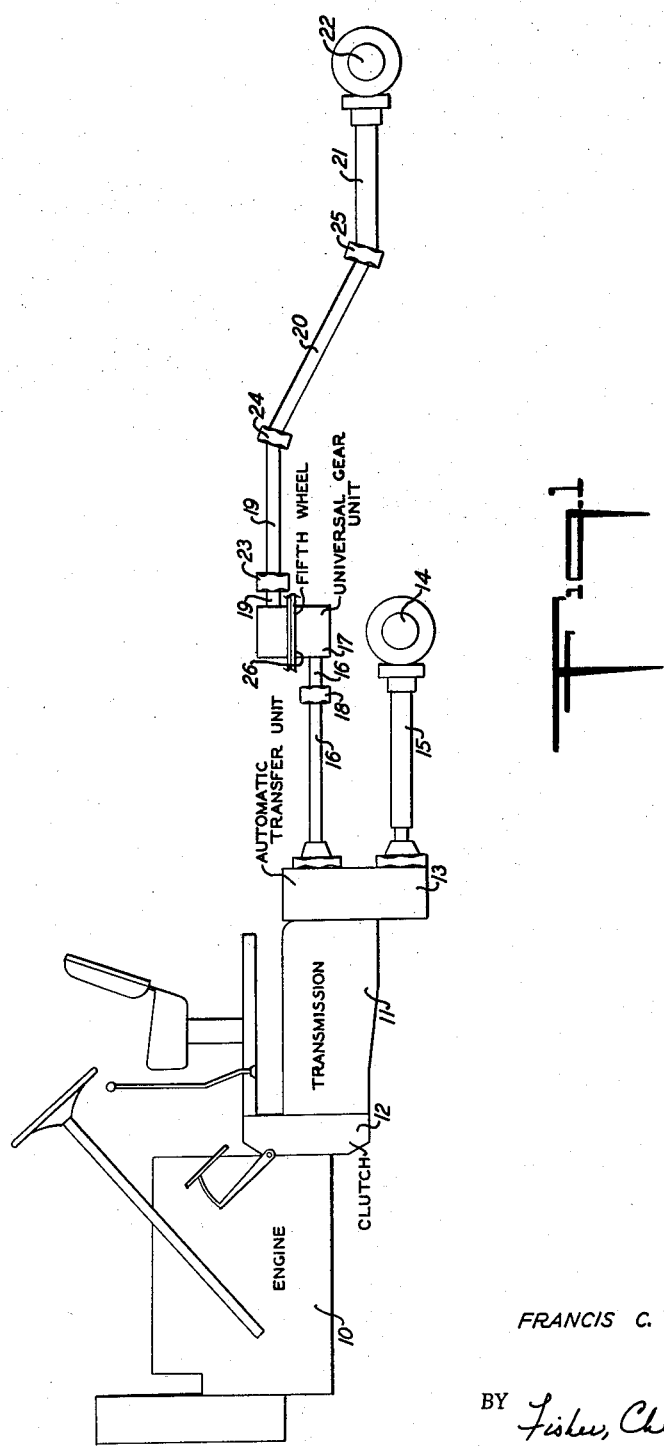

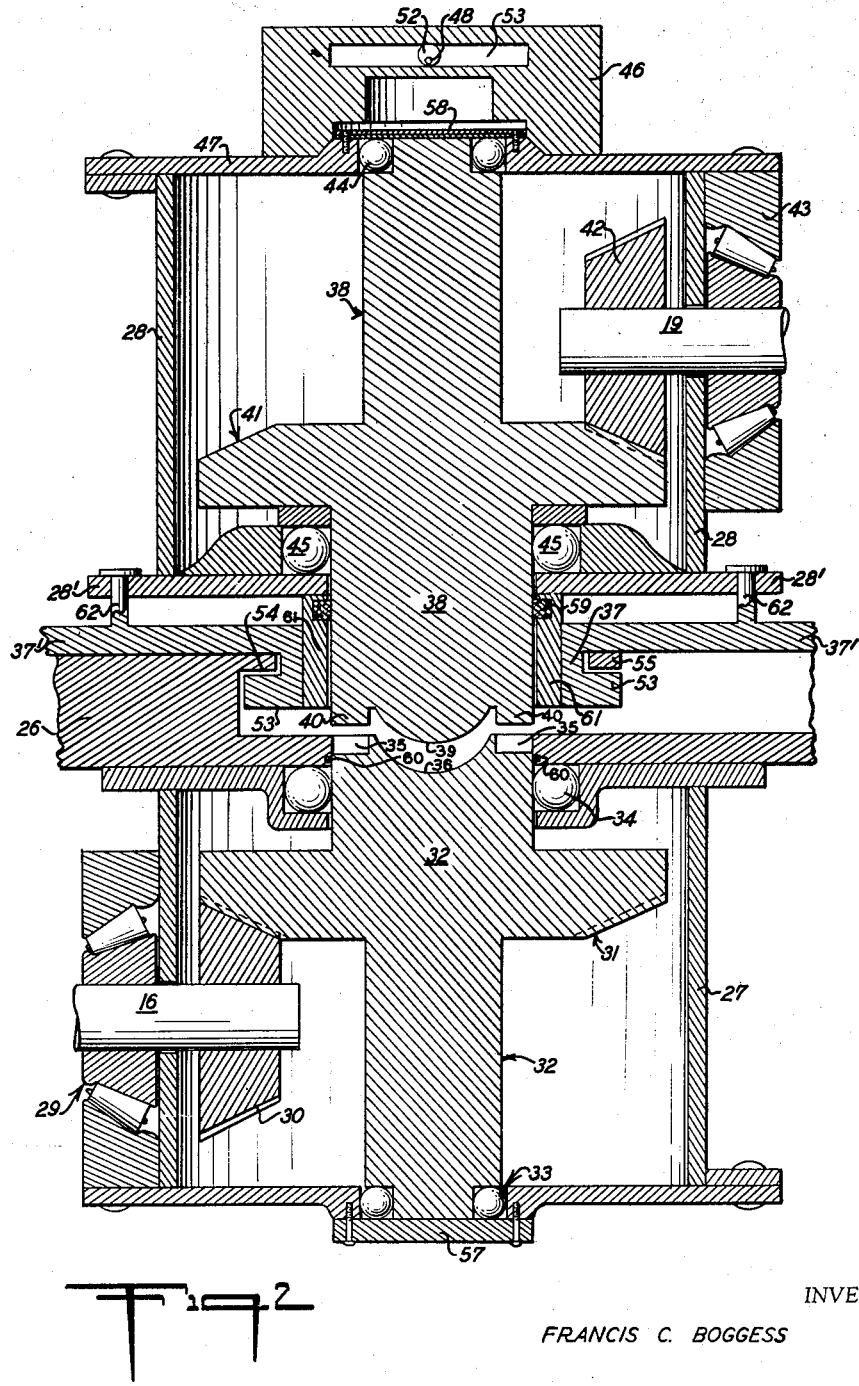

INVENTOR
FRANCIS C. BOGGESS
BY Fisher, Christen & Woodson
ATTORNEYS

United States Patent Office 2,959,236
Patented Nov. 8, 1960

2,959,236

TRAILER DRIVE

Francis C. Boggess, R.F.D. 5, Box 497,
Charleston, W. Va.

Filed Mar. 14, 1958, Ser. No. 721,426

7 Claims. (Cl. 180—14)

This invention relates to a driving mechanism for trailers of so-called tractor-trailer combinations. More specifically, it relates to means for driving the trailer wheels of tractor-trailer combinations by a mechanism which is able to be uncoupled when the tractor is uncoupled from the trailer.

As is generally known, a conventional tractor-trailer combination comprises a tractor having power means and means for supplying power to the rear axle of the tractor. The conventional trailer is coupled to the tractor at the fifth wheel and is merely towed, with no power being supplied to the trailer wheels. The prior art attempts to provide means for driving the trailer wheels from the tractor engine have not met with commercial success. Thus, systems utilizing a separate engine on the trailer are expensive, subject to high maintenance costs and require elaborate controls for operating the trailer engine from the cab of the tractor. Due to certain operating conditions of a tractor-trailer combination, as when turning a corner, it is necessary that means be provided to compensate for the differences in torque and speed requirements of the tractor wheels and of the trailer wheels. My invention relates to a system for accomplishing this purpose. It is, therefore, a primary object of my invention to provide a novel system for driving the trailer wheels of a tractor-trailer combination in which the torque and speed requirements of the trailer wheels are automatically compensated for.

It is another object of this invention to provide a system for driving the trailer wheels of a tractor-trailer combination which is simply and readily adaptable to existing tractor-trailer combinations.

It is a further object of the invention to provide a novel tractor-trailer coupling means which serves to transmit power to the trailer wheels.

It is still a further object of the invention to provide a tractor-trailer coupling means which is flexible and permits relative movement between the tractor and trailer in a horizontal plane, in a vertical plane, and permits twisting action between the tractor and the trailer.

It is yet another object of the invention to provide a tractor-trailer coupling means, including means for supplying power to the trailer wheels, which is simply coupled and uncoupled. It is another object of the invention to provide a tractor-trailer coupling device in which the means for driving the trailer wheels is of rugged and lasting construction, economical, and requires little maintenance or attention.

It is a further object to provide a fifth wheel means including means for transmitting power to the trailer wheels in which all the movable parts thereof are housed in sealed, lubricated housings.

These and other objects of the invention will be apparent to those skilled in the art from the following detailed description.

The invention will be described in terms of tractor-trailer combinations which includes such combinations for use of highways, earth moving equipment, military vehicles and other such combinations involving a tractor, which may be a truck, bulldozer, tractor or the like, and detachable trailer means.

Referring now to the drawings:

Fig. 1 schematically illustrates my invention showing the essential parts of a tractor-trailer combination;

Fig. 2 is an enlarged view in cross-section showing the details of the power transmitting means at the fifth wheel of the tractor-trailer combination;

Fig. 3 shows a top plan view of the fifth wheel assembly of the tractor embodying my invention;

Fig. 4 is a schematic illustration of the means for coupling and uncoupling the power transmitting means at the fifth wheel of the trailer;

Figure 5:
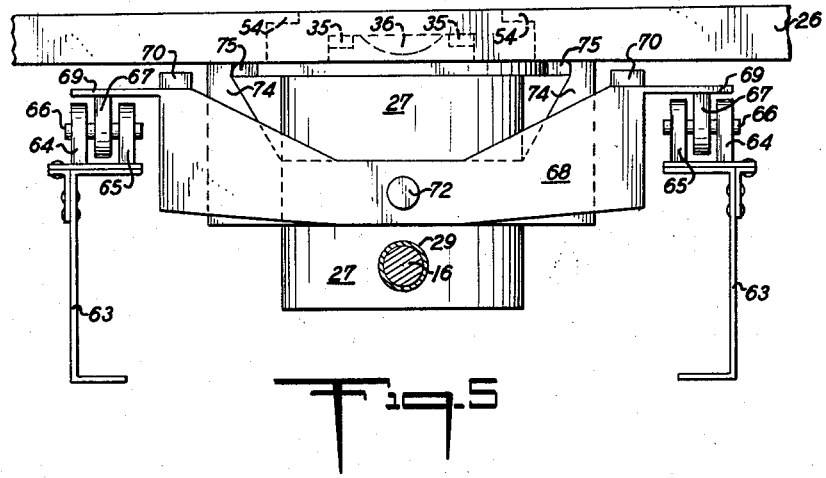
Fig. 5 is a detail view of the fifth wheel assembly of the tractor, looking toward the rear thereof from the front of the tractor.

The tractor units include an engine 10, transmission 11, and a conventional clutch 12 of the type normally employed on tractors. Numeral 13 indicates an automatic transfer unit for dividing the power between the trailer wheels and the tractor wheels which will be described in greater detail. Power is imparted to the rear wheels of the rear axle 14 of the tractor by a drive shaft 15 in the usual fashion. Power is also imparted from the transfer unit 13 to drive shaft 16 to the universal gear arrangement which is shown at 17. The driving connection between drive shaft 16 and the universal swivel gear unit 17 is through a conventional universal joint 18. Drive shaft 16 also includes conventional telescoping mechanism to permit relative movement between the universal swivel gear unit 17 and the transfer unit 13. Power is imparted in the universal swivel gear 17 to drive shafts 19, 20 and 21 for driving the trailer axle 22 through conventional universal joints 23, 24 and 25. The drive shafts 19 and 20 also include a conventional telescoping mechanism to permit relative movement between the axle 20 and the universal swivel gear unit 17. The fifth wheel of the tractor is illustrated in Fig. 1 at numeral 26.

As is apparent from Fig. 2, showing a detail of the universal swivel gear arrangement 17, the same is in two parts; a lower housing 27 carried by the tractor and an upper housing 28 carried by the trailer. In Fig. 2, drive shaft 16 is suitably journaled in bearing 29 and carries a pinion 30 engaging gear 31 carried on shaft 32 which is suitably journaled in bearings 33 and 34. Thus, the rotation of drive shaft 16 imparts rotation to the shaft 32. The upper exposed end of shaft 32 carries a plurality of indentations 35 and a centering depression 36.

The trailer carries a conventional king pin 37 fixedly secured to the trailer by plate 37' and the housing 28 is slidably mounted with respect to the trailer and king pin in a vertical direction, by holes in plate 28' and pins 62 secured to plate 37'. The upper movable housing 28 carries a sleeve 61 and rotatably carries shaft 38 having an exposed centering portion 39 for mating with the centering depression 36 on the shaft 32 and also has a plurality of mating dogs 40 for mating connection with the plurality of depressions 35 on shaft 32. Gear 41 is carried by shaft 38, meshing with pinion 42 carried on drive shaft 19 journaled in suitable bearings 43. The shaft 38 is journaled in upper bearings 44 and in lower bearing 45. The entire housing, including the shaft 38 carried therein, is movable up and down with respect to the trailer and its king pin 37.

The mechanism for effecting this movement involves a pair of plates 46 secured to the top plate 47 of the upper housing 28. This is particularly shown in Fig. 4. An elevating axle 48 is journaled in bearings 49 and 50 which are carried by the trailer frame members 51. The axle 48 carries a pair of eccentrics 52 secured thereto which are rotatable in slots 53 of the members 46. It is apparent that upon rotation of the crank 54, which is secured to the shaft 48, through 180°, the eccentrics will raise or lower the entire assembly including the part 46, housing 28 and all the gearing carried thereby. This movement engages and disengages the shafts 32 and 38 for coupling and uncoupling the universal swivel gear unit. In Fig. 2, the shaft 48 is shown in the position whereby the eccentric 52 has elevated the entire assembly so that the shafts 32 and 38 are not in engagement. The king pin 37 carries an annular flange 53 which slides under an overlapping portion 54 of the fifth wheel plate 26. A conventional locking lever 55 (see also Fig. 3) prevents the king pin 37 from becoming detached from the fifth wheel plate 26. This locking lever is moved into and out of engagement by conventional locking arm 56, shown in Fig. 3. The conventional mechanism beneath the fifth wheel plate for effecting the locking of the king pin 37 is not shown. The bearings 33 and 44 have suitable removable bearing caps 57 and 58, respectively, so as to provide ready access to the bearings for replacement or maintenance. Housings 27 and 28 are filled with lubricant for the gearing contained therein and its escape is prevented by means of packing seals 59 in sleeve 61 and 60 in the lower housing 27.

The gears 31 and 41 and the associated pinions 30 and 42, respectively, are preferably of the so-called "hypoid" type. The illustration of Fig. 2 shows these gears schematically, however.

The transfer unit 13, which divides the power from the engine between the drive shafts 15 and 16 serves to compensate for the different torque and speed requirements of drive shafts 15 and 16. The transfer units for automatically compensating for the torque and speed differences known for use on four-wheel drive vehicles may be used. Suitable transfer mechanism is shown in U.S. Patent Number 2,203,282 which includes a differential mechanism for dividing the power between the two shafts 15 and 16. The transfer means illustrated in this patent additionally includes change-speed gearing and manually-operated mechanism for locking out the differential mechanism in the event one set of wheels, either the tractor wheels or the trailer wheels, has lost all traction. In addition to the transfer means typically illustrated by Patent Number 2,203,282, other transfer means, such as shown in Patent Number 2,687,656, which automatically couple and uncouple the pair of shafts 15 and 16 according to the power torque demands and also provides for differential speed between the two shafts, may be used. The essential feature of the transfer unit is that it will permit and automatically compensate for the difference in torque and speed required at the tractor axle 14 and the trailer axle 22. This permits greatly increased traction by providing power at the trailer axle 22 as on hills and during turning sharp corners, when the tractor and trailer are out of end-to-end alignment. The transfer unit also preferably includes manually operated means for uncoupling drive shaft 16 when it is desired to drive the tractor wheels only.

Figure 6:
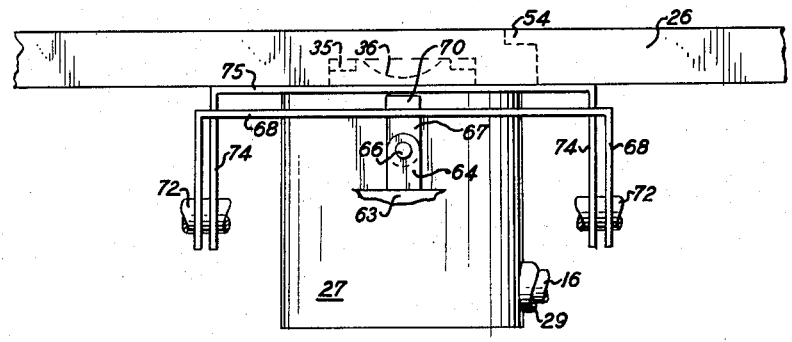
Fig. 6 is a side view of the fifth wheel assembly shown in Fig. 5, with the unnecessary parts not being illustrated.
Figure 7:
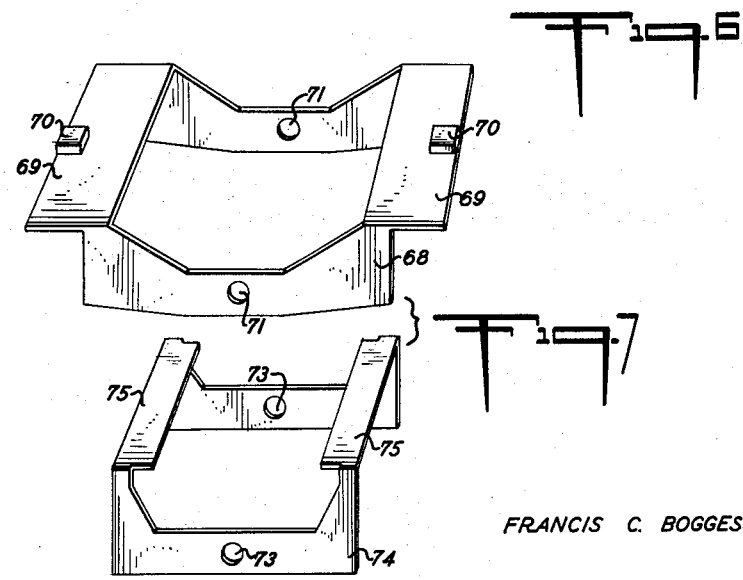
Fig. 7 is a perspective detail of parts of the universally-movable fifth wheel assembly of the tractor.

Referring to Figs. 5, 6 and 7, the frame on the tractor is indicated by member 63. Each frame member carries a pair of bearings 64 and 65. A cradle member 68 has a pair of flange surfaces 69 which carry at the midpoint thereof bearing members 67. These bearings 67 are suitably journaled on pins 66 carried by the bearing members 64 and 65 of the frame. The frame members extend longitudinally of the tractor and accordingly cradle 68 is pivotally supported on a horizontal axis transverse to the longitudinal frame members. A second cradle 74 is pivotally carried by cradle 68 by bearing pins 72 extending through holes 71 and 73 in cradles 68 and 74, respectively. Cradle member 74 additionally has flange surface members 75 which are fastened to the fifth wheel 26. Accordingly, the fifth wheel may pivot about two horizontal axes; one axis parallel to the tractor frame and another axis perpendicular thereto. This permits the tractor and trailer to be twisted with respect to each other and also permits relative disalignment between the tractor and trailer as when going over the crest of a hill or at the bottom of a dip. This construction permits this flexibility without placing strains on the bottom housing 27 of the universal gear assembly. The bottom housing 27 of the universal gear is secured to the fifth wheel plate as previously described. Resilient blocks 70 are positioned on the top of the cradle flanges 69 to dampen and take up the shocks from the movable fifth wheel 26.

In operation, the trailer is coupled to the tractor in a simple fashion. The upper housing 28 is elevated in its uppermost position by rotation of the crank 54. The tractor is backed under the plate 37' so that the king pin of the trailer 37 is positioned within the fifth wheel opening and the annular flange 53 on the king pin fits under the projection 54 of the fifth wheel plate. Thereafter, the king pin is latched into position by locking lever 55. Thereafter, the crank 54 is rotated to lower the housing 28 and mesh the projections 40 carried by shaft 38 of the upper housing with the depressions 35 on the exposed end of lower shaft 32. The tractor-trailer combination is then ready for operation.

It is apparent that the moving gears in the upper housing 28 and lower housing 27 are sealed in lubricant and, thus, are not subject to wear or the presence of foreign matter. The shafts 32 and 38 are thereby able to be coupled and uncoupled without moving any internal parts of the universal gear assembly, which prevents loss of lubricant and prevents the foreign matter entering the housings 27 and 28.

After the tractor and trailer are coupled and the universal gear operatively coupled as described above, the tractor-trailer unit is ready for operation. When the trailer moves out of alignment with the tractor as in turning corners, jack-knifing at 90° or more, for parking purposes, etc., housings 27 and 28 are rotatable relative to each other.

In practice, the fifth wheel plate 26 is coated with a layer of grease or other lubricant to facilitate the relative rotation between the fifth wheel plate 26 and plate 37' carried by the trailer.

As pointed out above, the drive shafts 16, 19 and 20 are provided with universal joints 18, 23, 24 and 25 respectively, and also are provided with conventional telescoping mechanism which permits limited movement in any direction of the universal gear units with respect to the shafts. Thus, the up and down coupling movement of housing 28 is permitted as well as the tilting and twisting movement of the fifth wheel by virtue of the pivoted cradle arrangement described above. By means of the transfer unit 13, power may be supplied to the trailer wheels to drive the same and in a fashion which automatically compensates for the different speed and torque requirements of the trailer wheels as compared to the tractor wheels.

It is apparent that the mechanism described may readily be adapted to existing tractor-trailer combinations by adding the transfer unit, trailer axle and drive shafts and substituting the fifth wheel having the universal gear carried thereby. The system is also adaptable to tractors and/or trailers using four wheel bogies and to front wheel drive tractors.

While the invention has been described and illustrated in terms of certain embodiments, such embodiments are to be considered illustrative rather than limiting and it is intended to cover all modifications that fall within the spirit and scope of the appended claims.

I claim:

1. A coupling device for establishing a drive connection between a tractor and a trailer comprising a first coupling housing supported by the tractor, a second coupling housing supported by the trailer, and rotatable with respect to said first housing, a first drive means rotatably secured in said first housing, and having an exposed coupling face, a second drive means rotatably secured to said second housing and having an exposed coupling face for mating with the coupling face of said first drive means, means for coupling said first and second housings and thereby operatively connecting said two drive means at their exposed faces.

2. The coupling device set forth in claim 1 wherein said second housing is vertically movable with respect to said first housing for uncoupling said coupling faces.

3. The coupling device set forth in claim 2 wherein means for vertically moving said second housing comprises an eccentric cam supported by said trailer engaging a bearing surface on said second housing.

4. A coupling device for establishing a drive connection between a tractor and a trailer comprising a lower housing supported by the tractor and an upper housing supported by the trailer, a generally horizontal drive shaft journaled through said lower housing, a generally vertical drive shaft driven by said horizontal drive shaft, a second generally vertical drive shaft in said upper housing, a second generally horizontal drive shaft journaled through said upper housing and driven by the second vertical drive shaft, a coupling means for operatively connecting said two vertical drive shafts, and a housing uncoupling means having an eccentric cam supported by said tractor and in engagement with said upper housing whereby said second vertical drive shaft can be lifted from engagement with said first vertical drive shaft, when said upper and lower housings are disconnected.

5. A coupling device for establishing a drive connection between a tractor and a trailer comprising a lower housing supported by the tractor and an upper housing supported by the trailer, a generally horizontal drive shaft journaled through said lower housing, a generally vertical drive shaft driven by said horizontal drive shaft, a second generally vertical drive shaft in said upper housing, a second generally horizontal drive shaft journaled through said upper housing and driven by the second vertical drive shaft, a coupling means for operatively connecting said two vertical drive shafts, and housing uncoupling means whereby said lower housing and its associated vertical drive shaft can be lifted from engagement with said upper housing and its associated vertical drive shaft.

6. The coupling device as described in claim 5 wherein said upper and lower housings are rotatable with respect to each other.

7. In a device for connecting a tractor and a trailer, the combination comprising, longitudinal frame means on the tractor, a first cradle member mounted on said frame for pivotable movement on an axis transverse to said frame means, a second cradle member carried by said first cradle member for pivotable movement on an axis parallel to said frame means, a fifth wheel secured to said second cradle, means on said trailer for detachably connecting said trailer to said fifth wheel, said fifth wheel carrying a first coupling housing having drive means secured therein and having an exposed coupling face, said means on said trailer comprising a second coupling housing having drive means secured therein and having an exposed coupling face for mating with the coupling face of said first coupling housing, and means for coupling said first and second housings and thereby operatively connecting said two drive means.

References Cited in the file of this patent

UNITED STATES PATENTS

| | | |
|---|---|---|
| 974,877 | Greene | Nov. 8, 1910 |
| 1,527,333 | Schellenger | Feb. 24, 1925 |
| 1,568,168 | Land | Jan. 5, 1926 |
| 1,661,737 | Raimer | Mar. 6, 1928 |
| 2,126,597 | Zeilman | Aug. 9, 1938 |
| 2,178,841 | Lubbers | Nov. 7, 1939 |
| 2,180,048 | Gurton et al. | Nov. 14, 1939 |
| 2,276,573 | Gustafson | Mar. 17, 1942 |
| 2,460,725 | Armington | Feb. 1, 1949 |
| 2,485,878 | Hanlon | Oct. 25, 1949 |
| 2,541,209 | Cox | Feb. 13, 1951 |
| 2,687,656 | Keese | Aug. 31, 1954 |
| 2,724,448 | Rossler et al. | Nov. 22, 1955 |
| 2,875,644 | Mancini | Mar. 3, 1959 |